United States Patent
West et al.

(10) Patent No.: US 9,931,654 B2
(45) Date of Patent: Apr. 3, 2018

(54) PORTABLE FLUID DISPERSAL DEVICE

(71) Applicants: Scott Allen West, Mesa, AZ (US); Jason Gust West, Mesa, AZ (US)

(72) Inventors: Scott Allen West, Mesa, AZ (US); Jason Gust West, Mesa, AZ (US)

(*) Notice: Subject to any disclaimer, the term of this patent is extended or adjusted under 35 U.S.C. 154(b) by 0 days.

(21) Appl. No.: 14/746,709

(22) Filed: Jun. 22, 2015

(65) Prior Publication Data
US 2015/0283570 A1 Oct. 8, 2015

Related U.S. Application Data

(63) Continuation-in-part of application No. 13/299,023, filed on Nov. 17, 2011, now Pat. No. 9,061,325.

(60) Provisional application No. 61/414,526, filed on Nov. 17, 2010.

(51) Int. Cl.
| | | |
|---|---|---|
| *B05B 7/24* | (2006.01) | |
| *B05B 9/08* | (2006.01) | |
| *B05B 1/20* | (2006.01) | |
| *B08B 3/02* | (2006.01) | |
| *B08B 9/032* | (2006.01) | |
| *F04B 17/06* | (2006.01) | |
| *F04B 23/02* | (2006.01) | |
| *B62J 11/00* | (2006.01) | |
| *B62J 11/02* | (2006.01) | |
| *B62J 33/00* | (2006.01) | |

(52) U.S. Cl.
CPC .......... *B05B 7/2475* (2013.01); *B05B 7/2472* (2013.01); *B05B 7/2489* (2013.01); *B05B 9/0811* (2013.01); *B05B 9/0816* (2013.01); *B08B 3/026* (2013.01); *B08B 9/0326* (2013.01); *B08B 9/0327* (2013.01); *B08B 9/0328* (2013.01); *B62J 11/00* (2013.01); *B62J 11/02* (2013.01); *B62J 33/00* (2013.01); *F04B 17/06* (2013.01); *F04B 23/02* (2013.01); *B05B 1/20* (2013.01)

(58) Field of Classification Search
CPC .................................................. B05B 9/0833
See application file for complete search history.

(56) References Cited

U.S. PATENT DOCUMENTS

| | | |
|---|---|---|
| 384,630 A | 6/1888 | Koechlin |
| 2,705,171 A | 3/1955 | Ziherl |
| 3,142,443 A | 7/1964 | Morgan |
| 3,727,841 A | 4/1973 | Hengeshbach |
| 4,298,166 A | 11/1981 | White et al. |

(Continued)

OTHER PUBLICATIONS

USPTO; Office Action Restriction dated Nov. 27, 2013 in U.S. Appl. No. 13/299,023.

(Continued)

*Primary Examiner* — Nicole Blan
(74) *Attorney, Agent, or Firm* — Snell & Wilmer, L.L.P.

(57) ABSTRACT

The disclosure includes a system comprising a first chamber having pressurized gas, a compressor connected to the first chamber (which may be a bladder), and a second chamber connected to the first chamber. The second chamber includes contents. The system also includes an exit from the second chamber. The pressurized gas from the first chamber travels into the second chamber to force the contents out of the exit of the second chamber. The compressor increases the pressure of the gas in the first chamber.

20 Claims, 11 Drawing Sheets

(56) References Cited

U.S. PATENT DOCUMENTS

| | | | |
|---|---|---|---|
| 4,702,416 A | | 10/1987 | Pagliai et al. |
| 4,899,940 A | | 2/1990 | Leaver |
| 5,121,882 A | | 6/1992 | Skidmore |
| 5,273,214 A | | 12/1993 | Huffstutler |
| 5,330,104 A | | 7/1994 | Marcus |
| 5,335,853 A | | 8/1994 | Wirz |
| 5,399,072 A | * | 3/1995 | Westphal ................ F04B 35/06 137/565.18 |
| 5,409,167 A | | 4/1995 | Borod |
| 5,535,951 A | | 7/1996 | Utter |
| 5,746,252 A | | 5/1998 | Henson |
| 5,775,590 A | | 7/1998 | Utter |
| 5,931,207 A | | 8/1999 | Gianino |
| 6,189,805 B1 | * | 2/2001 | West .......................... B05B 1/20 239/152 |
| 7,115,832 B1 | | 10/2006 | Blankenship et al. |
| 9,061,325 B2 | | 6/2015 | West et al. |
| 2003/0080445 A1 | * | 5/2003 | Howe .................... A01N 25/16 261/72.1 |
| 2003/0116646 A1 | | 6/2003 | You |
| 2003/0192963 A1 | | 10/2003 | Ebberts |
| 2008/0061166 A1 | * | 3/2008 | Jacques ............... A01M 7/0046 239/373 |
| 2009/0127486 A1 | * | 5/2009 | O'Reilly ............. F16K 27/0236 251/129.04 |
| 2009/0152382 A1 | | 6/2009 | Charpie |
| 2009/0256004 A1 | * | 10/2009 | Hornsby ................... A61L 2/22 239/302 |
| 2009/0266917 A1 | * | 10/2009 | Klein ...................... B05B 15/02 239/337 |
| 2010/0181345 A1 | * | 7/2010 | Hilarides .............. B05B 9/0822 222/386.5 |
| 2012/0175429 A1 | * | 7/2012 | Zupsic .................. B05B 7/2467 239/8 |

OTHER PUBLICATIONS

USPTO; Office Action dated Feb. 7, 2014 in U.S. Appl. No. 13/299,023.

USPTO; Final Office Action dated Jul. 17, 2014 in U.S. Appl. No. 13/299,023.

USPTO; Advisory Action dated Jul. 30, 2014 in U.S. Appl. No. 13/299,023.

USPTO; Office Action dated Jan. 7, 2015 in U.S. Appl. No. 13/299,023.

USPTO; Notice of Allowance dated Feb. 26, 2015 in U.S. Appl. No. 13/299,023.

USPTO; Office Action dated Aug. 26, 1999 in U.S. Appl. No. 09/160,070.

USPTO; Final Office Action dated Feb. 3, 2000 in U.S. Appl. No. 09/160,070.

USPTO; Advisory Action dated Jun. 7, 2000 in U.S. Appl. No. 09/160,070.

USPTO; Notice of Allowance dated Aug. 21, 2000 in U.S. Appl. No. 09/160,070.

* cited by examiner

PORTABLE FLUID DISPERSAL DEVICE

RELATED APPLICATIONS

This application is a continuation-in-part of, claims priority to and the benefit of, U.S. Ser. No. 13/299,023 filed Nov. 17, 2011 and entitled "AUTOMATIC PORTABLE FLUID DISPERSAL DEVICE." The '023 application claims priority to and the benefit of U.S. Provisional Application Ser. No. 61/414,526 filed Nov. 17, 2010 and entitled "AUTOMATIC PORTABLE FLUID DISPERSAL DEVICE." Both of which are incorporated herein by reference in their entirety for all purposes.

FIELD

This disclosure generally relates to fluid dispersal devices, and more particularly, to an automatic, portable and compact fluid dispersal device for dispersing various types of liquids and substances.

BACKGROUND

A typical fluid dispersal device includes one tank that includes an inlet for a hose that supplies pressure inside the tank. The tank also includes an outlet, wherein in response to the pressure, the fluid inside the tank is forced out of the outlet. A typical fluid dispersal device needs to be connected to a long hose that supplies pressure to the device. The long hose needs to be connected to a large compressor. The long hose and large compressor usually limit the portability of the fluid dispersal device. In fact, fluid dispersal devices are often not portable at all, due to the need to connect to a long hose and large compressor. A need exists to include cordless fluid dispersal devices on portable devices (e.g., bicycles) or when using sprayers in different areas of a structure or while climbing a ladder.

There is also a need for fluid dispersal device that incorporates a misting apparatus for indoor or outdoor environments that is portable, easy to use, easy to store, unobtrusive, and effective for distributing fluid to a localized area. Accordingly, it is desirable that the misting apparatus be portable for ready transportation to a variety of outdoor locations (e.g., a yard, a beach, a boat, a campground or the like) and be adaptable for specific use by one or more persons. It is also desirable that the quantity of fluid dispensed be controllable to maintain comfort and to avoid over or under saturation during outdoor activities. It is also desirable that the apparatus be low cost, easy to operate and operate with a mobile power source (e.g., a battery).

SUMMARY

The disclosure includes a system comprising a first chamber having pressurized gas, a compressor connected to the first chamber (which may be a bladder), and a second chamber connected to the first chamber. The second chamber includes contents. The system also includes an exit from the second chamber. The pressurized gas from the first chamber travels into the second chamber to force the contents out of the exit of the second chamber. The compressor increases the pressure of the gas in the first chamber.

The system may also include a backflow valve, inline filter, adjustable flow knob, pressure relief valve, timer or a pressure gauge. The system may also include a pressure relay to control a pressure of the gas in the first chamber. The pressure relay may interface with the first chamber to pressurize the gas to a desired pressure. The pressure relay may be manual, electric and/or software controlled. The system may include a pressure regulatory value to reduce a pressure of the gas in the first chamber, in response to the pressure exceeding a certain threshold pressure. The system may include an air hose interfacing with the first chamber for providing pressurized air to other items. The system may also include a third chamber for disbursing contents inline, into the first chamber and/or into the second chamber.

The compressor may be removably connected to the first chamber. The second chamber may be connected to the first chamber via a channel. The pressurized gas in the first chamber may stay at a constant pressure when not in use. The compressor may be cordless, battery operated and/or solar powered. In response to the contents exiting the second chamber, the pressurizing gas exits from the exit in the second chamber.

The system may include an auxiliary jack to interface with an extra line, wherein the extra line provides additional of at least one of the gas or the content. The system may include a controller to control the disbursement of at least one of gas or content into a bicycle tire at different geographic locations. The system may include a backpack having a misting device, drinking water device, eye flush device and/or wound cleaning device.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the, it should be understood that other embodiments may be realized and that logical and mechanical changes may be made without departing from the spirit and scope of the. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

With reference to the accompanying Figures, the present generally includes a portable apparatus which delivers a fine spray or mist of fluid. In various embodiments, the spray or mist for example the comfortable and efficient outdoor cooling of an area. This may be used to provide comfort via a cooling mist to a human or other animal. In various embodiments, the spray or mister may be configured to be used as a portable bug sprayer, weed sprayer, fogger, defogger, pest prevention tool (e.g. ants, scorpions, and spiders), motor degreaser, pheromone sprayer (to attract game), paint sprayer, deck & fence oiling sprayer, body temperature regulator, eye flush, window washer, pressure washer, plant waterer, personal home maintenance tool, and/or the like. For instance, this system may assist with the prevention of disease, (e.g. the spread of malaria and/or west nile virus) by reducing mosquito populations around users. In various embodiments, the apparatus disclosed herein may be configured for pressurizing beer kegs. For instance, using air instead of other gas to pressurize the keg. In various embodiments, the apparatus disclosed herein may be configured for clearing clogged pipes.

Figure 1:
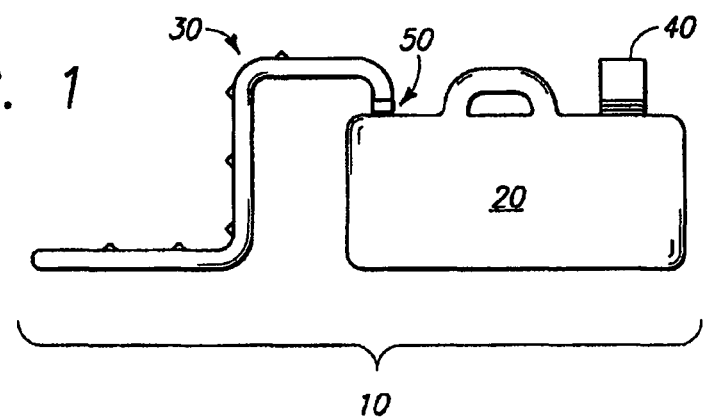
FIG. 1 depicts an exemplary misting apparatus in accordance with various embodiments.

Portable misting device 10 may comprise, with particular reference to FIG. 1, a pressurizable fluid tank 20, a fluid conduit 30, an automatic air compressor 40, and a valve 50. In various embodiments, portable misting device 10 may comprise an inline filter for filtering debris from the system. In various embodiments, the inline filter may be located in at least one of the hose line, the outlet of the tank, and between the output of automatic air compressor 40 and the distal end of fluid conduit 30. In various embodiments, portable misting device 10 may comprise a pressure gauge and valve to indicate pressure of a pressurizable fluid tank 20. In various embodiments, portable misting device 10 may comprise a use timer for selecting the duration of portable misting device 10 operation.

Figure 2:
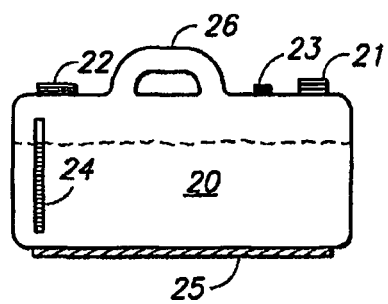
FIG. 2 depicts an exemplary pressurizable fluid tank in accordance with the apparatus of FIG. 1.

In FIG. 2, the pressurizable fluid tank 20 may have at least two openings or one opening which is divisible into two points of entry. A first opening 21 configured to couple with the pressurizing means 40, such as a compact air compressor, and a second opening 22 is configured to couple with the fluid conduit 30. One skilled in the art will appreciate that the openings can be at any suitable location on the fluid tank 20; however, the openings may be located at the top of the fluid tank 20. In various embodiments, fluid tank 20 includes a third opening 23 which allows easy refill of the tank without removing either the pressurizing means 40 or the fluid conduit 30. The first opening 21 and second opening 22 may be threaded to allow quick, air-tight coupling and de-coupling of the pressurizing means 40 and fluid conduit 30, respectively, to fluid tank 20. The third opening 23 may be threaded to accommodate a threaded plug or may be non-threaded and capped; however, all seals may be air-tight when the misting device is in operation. One skilled in the art will appreciate that any suitable coupling can be used to connect the fluid conduit 30 and the pressurizing means 40 to the fluid tank.

To facilitate transport, the fluid tank 20 may include a carrying means, such as a rigid or pliable handle, a strap, a harness, or the like. In various embodiments, a prefabricated fluid tank includes a rigid handle 26 disposed at the top of the tank. In various embodiments, prefabricated fluid tanks that comprise wheels or rollers that increase portability of the misting device are suitable for use in the present. In other embodiments, the misting system may be mounted on a vehicle such as a truck, car, bike, golf cart, riding lawnmower, cart or all terrain vehicle. This mounting may be facilitated via housing 70.

Fluid tank 20 may be constructed from a variety of materials, including plastics, polymers, metals and metal alloys. In various embodiments, lightweight, durable materials, such as polytetrafluroethylene (PTFE), are used. Prefabricated fluid tanks which can be adapted for use in the present are readily available at a variety of retail outlets.

In various embodiments, fluid tank 20 includes a level indicator means 24, such as a transparent window or external gauge, to indicate to the user when refill of the fluid tank is necessary. Many readily-available prefabricated fluid tanks include transparent windows that serve this purpose or a level indicator can be incorporated into the tank.

The fluid tank 20 may include a cleated or otherwise corrugated base 25 to increase stability and decrease sliding of the misting device 10 when used on inclines or in vehicles, such as boats. Another embodiment of the fluid tank 20 includes a hook or other device for securing fluid conduit 30 to the fluid tank when not in use for convenient storage and transport.

In various embodiments, portable misting device 10 may be docked in a docking station for coupling to a vehicle. In various embodiments, portable misting device 10 may be docked in a docking station for coupling to a power charging apparatus (e.g. to charge a battery). This docking station may be further coupled to a semi-permanent fluid conduit 30. For instance, a fluid conduit 30 run around a predefined area (such as a perimeter). This fluid conduit 30 may have nozzles spaced at pre-determined intervals or at locations of interest for delivering a fluid (or powder, gas, liquid) to the predefined area. For instance, in various embodiments, a user may couple portable misting device 10 to the docking station to enable pest prevention around the perimeter of their property. Various sections of fluid conduit 30 and/or the nozzles of fluid conduit may be disabled as desired. A timer (integral or coupled to the device) may be set to determine times of use, such as, weekly, monthly or daily. In various embodiments, a user may couple portable misting device 10 to the docking station to enable watering to plants.

Figure 3:
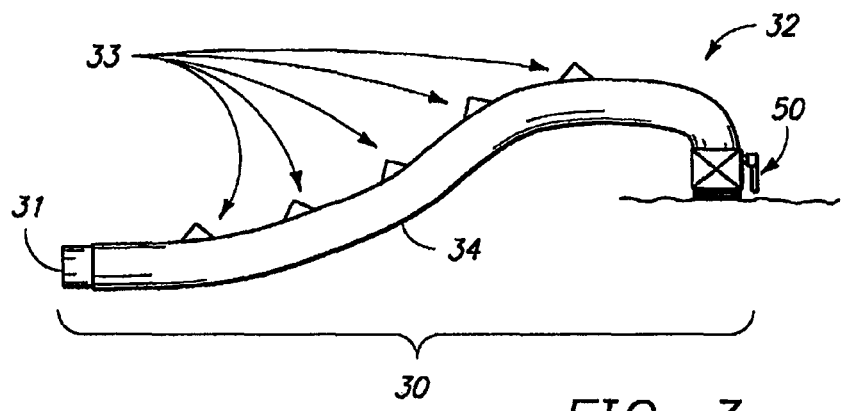
FIG. 3 depicts an exemplary fluid conduit in accordance with the apparatus of FIG. 1.

In FIG. 3, the fluid conduit 30 may comprise a length of tubing 34, either flexible or rigid, having a distal end 31 and a proximal end 32. The proximal end 32 is connected to the fluid tank 20 and the distal end 31 is closed or capped to terminate fluid flow at the distal end of the conduit 30. The fluid conduit 30 may include one or more holes or nozzles 33 spaced along the conduit for distributing fluid in the form of, for example, fine spray streams when fluid from the pressurized fluid tank 20 is forced through the fluid conduit 30. In various embodiments, the fluid conduit 30 comprises a plurality of nozzles 33 suitably spaced longitudinally along a flexible conduit 34 so as to generate a fine mist during operation. In various embodiments, the fluid conduit 30 comprises from about six to about twelve nozzles equally spaced along the conduit.

The fluid conduit 30 may be of any diameter or length suitable to achieve the objectives of the disclosure. The pressure output of the pressurizing means 40 and the volume of the fluid tank 20 will necessarily limit the diameter and length of the fluid conduit 30, as well as the number of holes or nozzles in the fluid conduit. The fluid conduit and nozzles are readily available at any plumbing supply or hardware store. In various embodiments, at least one MINI-MIST® portable cooling system kit manufactured by Arizona Mist, Inc., part no. 20060-20, is used. Each kit contains UV-resistant ¼ inch flexible tubing, brass and stainless steel mist nozzles, hanging snap clips, a hose adaptor and an end cap. The kit attaches securely to the fluid tank and the nozzles are adjustable to easily change the direction of spray. Multiple kits may be connected in series to provide additional cooling capacity.

The pressurizing means 40 is any suitable device configured to increase pressure inside the fluid tank 20, such as a compact air compressor, a manual air pump, and/or the like. In various embodiments, an automatic, compact air compressor is employed to pressurize the fluid tank 20. The air compressor base may be suitably threaded to attach securely to the first opening 21 in the fluid tank 20 and to form an air-tight seal. In various embodiments, the air compressor comprises a BLACK & DECKER® 7.2 Volt VERSAPAK™ multi-purpose cordless inflator with a modified plastic casing that allows air-tight threaded attachment of the compressor to the first opening 21 of the fluid tank 20. The VERSAPAK™ cordless inflator comprises a rechargeable nickel-cadmium battery pack as described in the Instruction Manual accompanying the device, which is hereby incorporated by reference. The air compressor may be lightweight and durable, as well as inexpensive and easy to maintain.

The pressurizing means 40 may include a power source and a power switch. The power source is any suitable device configured to supply power to the compressor, such as a battery, a rechargeable battery, AC electric power, a solar cell, a fuel-powered generator, and/or the like. In various embodiments, the air compressor 60 includes both a rechargeable battery pack and an AC adapter configured for use with an automobile auxiliary power outlet. In various embodiments, the air compressor 60 includes a remaining power indicator.

The pressurizing means 40 may be automatically controlled such that when the pressure inside the fluid tank 20 reaches a predetermined lower-limit value, such as about 25 psi, the pressurizing means 40 is brought into a load-running state to supply compressed air to the fluid tank 20. When the pressure inside the fluid tank 20 reaches a predetermined upper-limit value, such as about 45 psi, the pressurizing means 40 is brought into a stand-by state to suspend the supply of compressed air to the fluid tank 20. Automatic control of the pressurizing means 40 ensures safe and steady operation of the misting device 10 without the need for substantial user supervision or manual control.

Figure 4A:
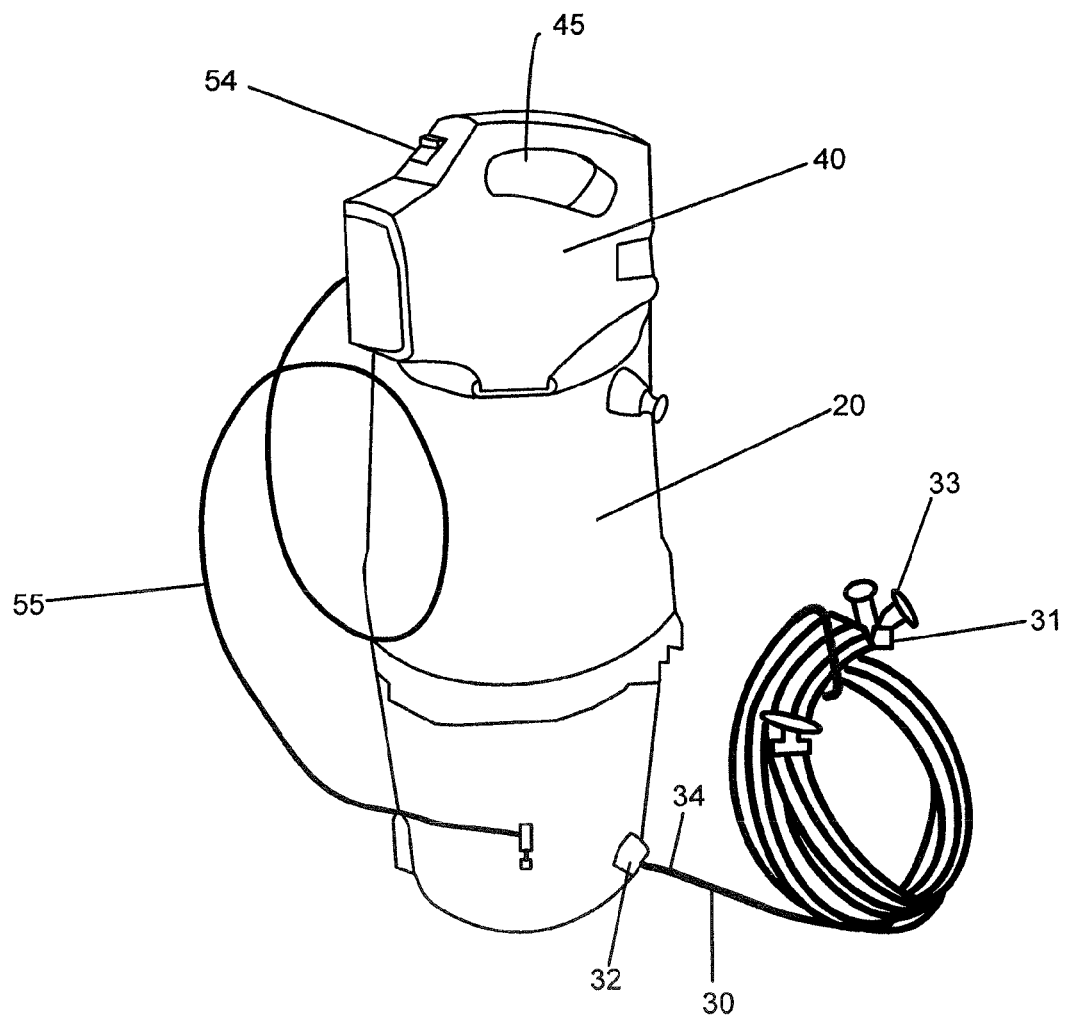
FIGS. 4A and 4B depict a fluid dispersal system and plurality of misting nozzles along a length of fluid conduit, in accordance with various embodiments.
Figure 4B:
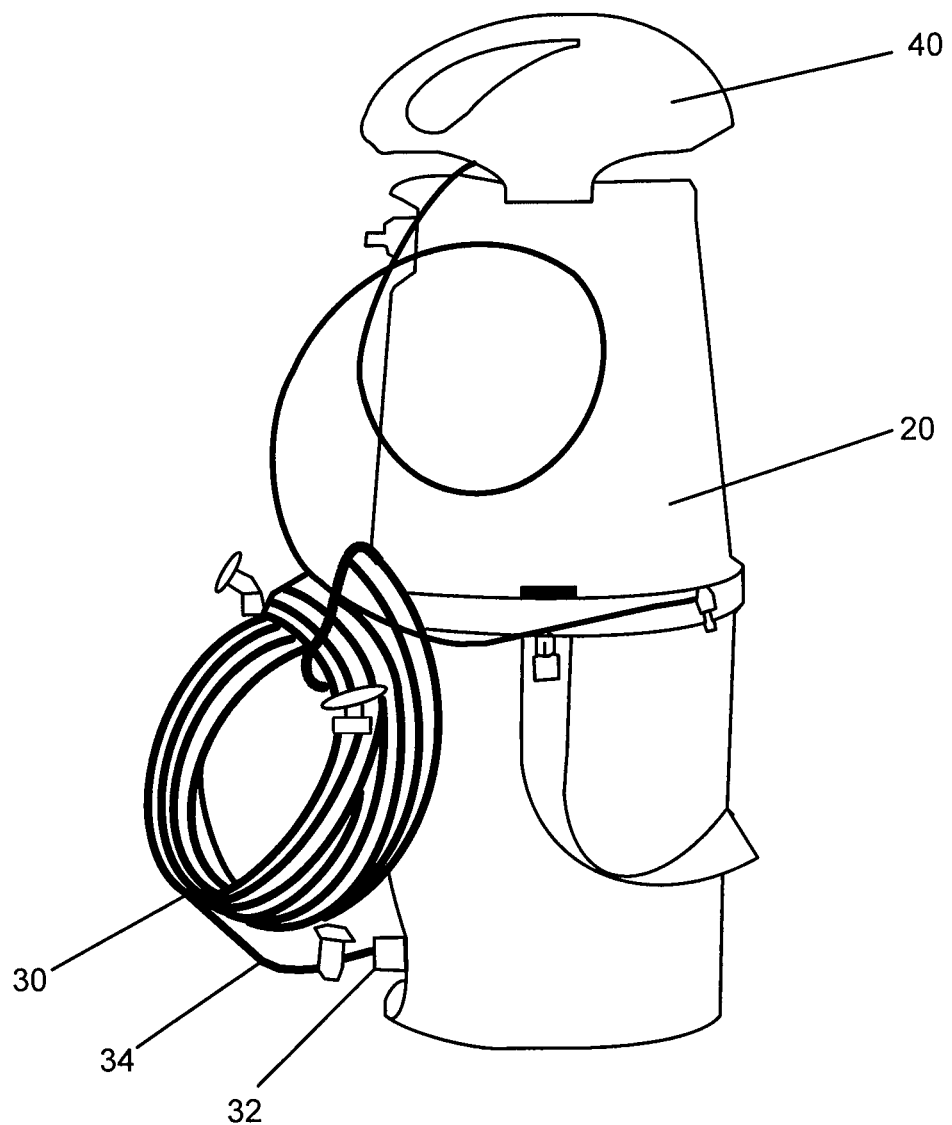

In various embodiments and with reference to FIGS. 4A and 4B, portable misting device 10 may comprise a switch 54 an auxiliary line 55. Switch 54 may be manual or automatic (electrical, pneumatic, etc). By toggling switch 54 between a first position and a second position, the feed of the compressor may be switch from being fed into a pressurizable fluid tank 20 to the auxiliary line 55. The distal end of auxiliary line 55 may comprise a standard adaptor for coupling with standard fittings (such as an adaptor, needle, and the like) for inflating tires, inflatable, tubes, balls, rafts and the like.

Figure 6:
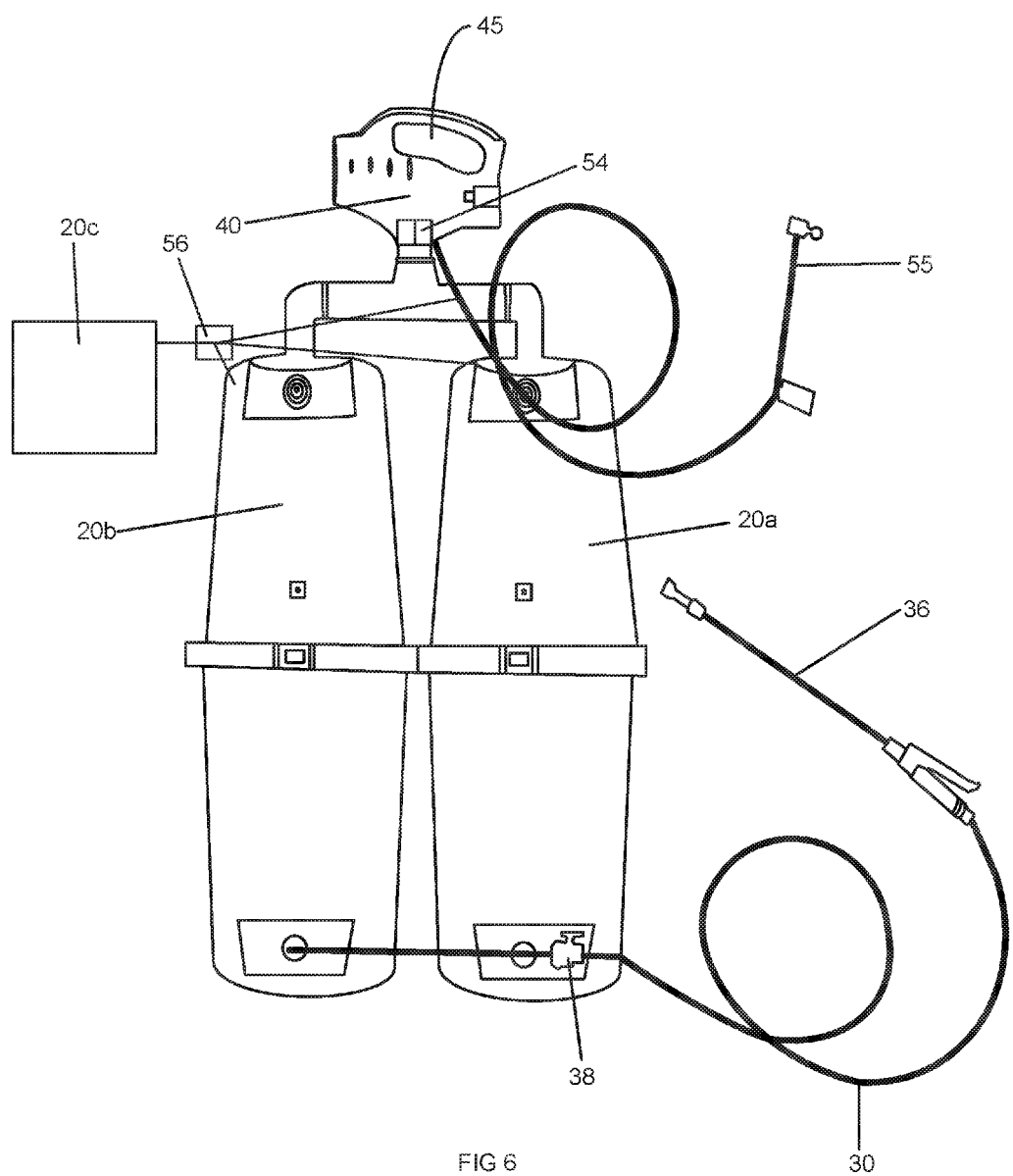
FIG. 6 depicts an exemplary fluid dispersal system comprising a plurality of pressurizable fluid tanks and wand, in accordance with various embodiments.

In various embodiments and with reference to FIG. 6, portable misting device 10 may comprise a switch 54 to toggle between a first pressurizable fluid tank and a second pressurizable fluid tank. In some embodiments, switch 54 may be positioned such that a feed of the compressor is allocated between pressurizable fluid tank 20a and to pressurizable fluid tank 20b. In various embodiments, portable misting device 10 may comprise a switch 38 to toggle between a first pressurizable fluid tank 20a and a second pressurizable fluid tank 20b. Switch 38 and/or switch 54 may be manual or automatic (electrical, pneumatic, etc). Thus, portable misting device 10 may switch between a weed sprayer to bug repellant sprayer. In various embodiments, portable misting device 10 may switch between a weed sprayer to cooling water mister. In various embodiments, portable misting device 10 may switch between a mister and an air pump for inflating rafts and/or balls. Portable misting device 10 may be toggled between any combination of disclosed uses and any number of pressurizable fluid tanks. In various embodiments, a pressurizable fluid tank (such as one filled with potable water) may comprise an additional line and valves such that a user may drink the water instead of being misted, or in addition to being misted. In various embodiments, a bladder bag (not depicted) may be coupled to the portable misting device 10 comprising potable water with a line to facilitate drinking the water by a user.

Figure 7:
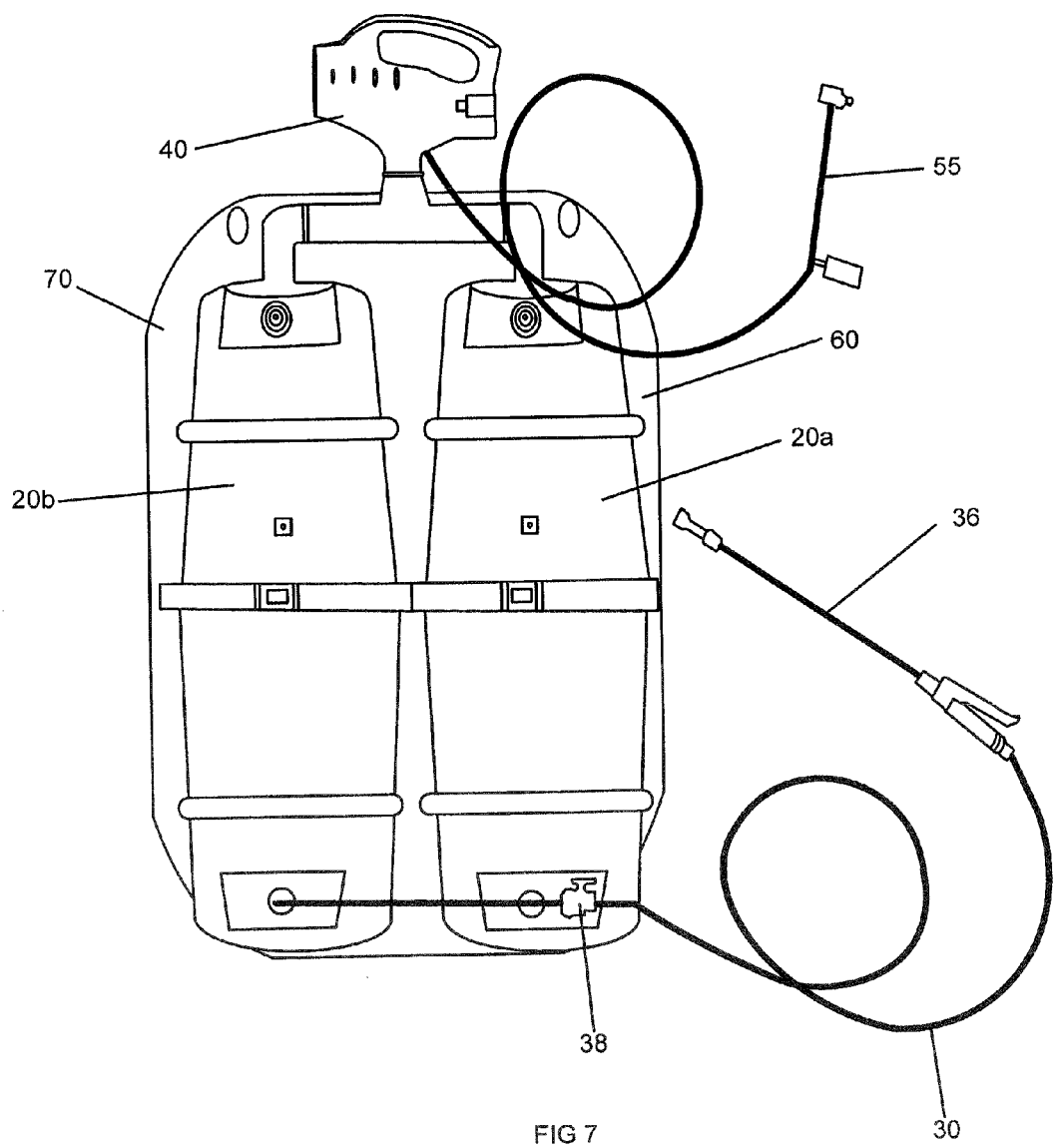
FIG. 7 depicts an exemplary fluid dispersal system comprising a plurality of pressurizable fluid tanks mounted on a housing, in accordance with various embodiments.

In various embodiments and with reference to FIG. 7, portable misting device 10 may comprise a mounting device 60 to mount at least a portion of the misting device 10. This may facilitate transport of the misting device on a vehicle, such as a truck, car, bike, golf cart, riding lawnmower, cart or all terrain vehicle.

Figure 8:
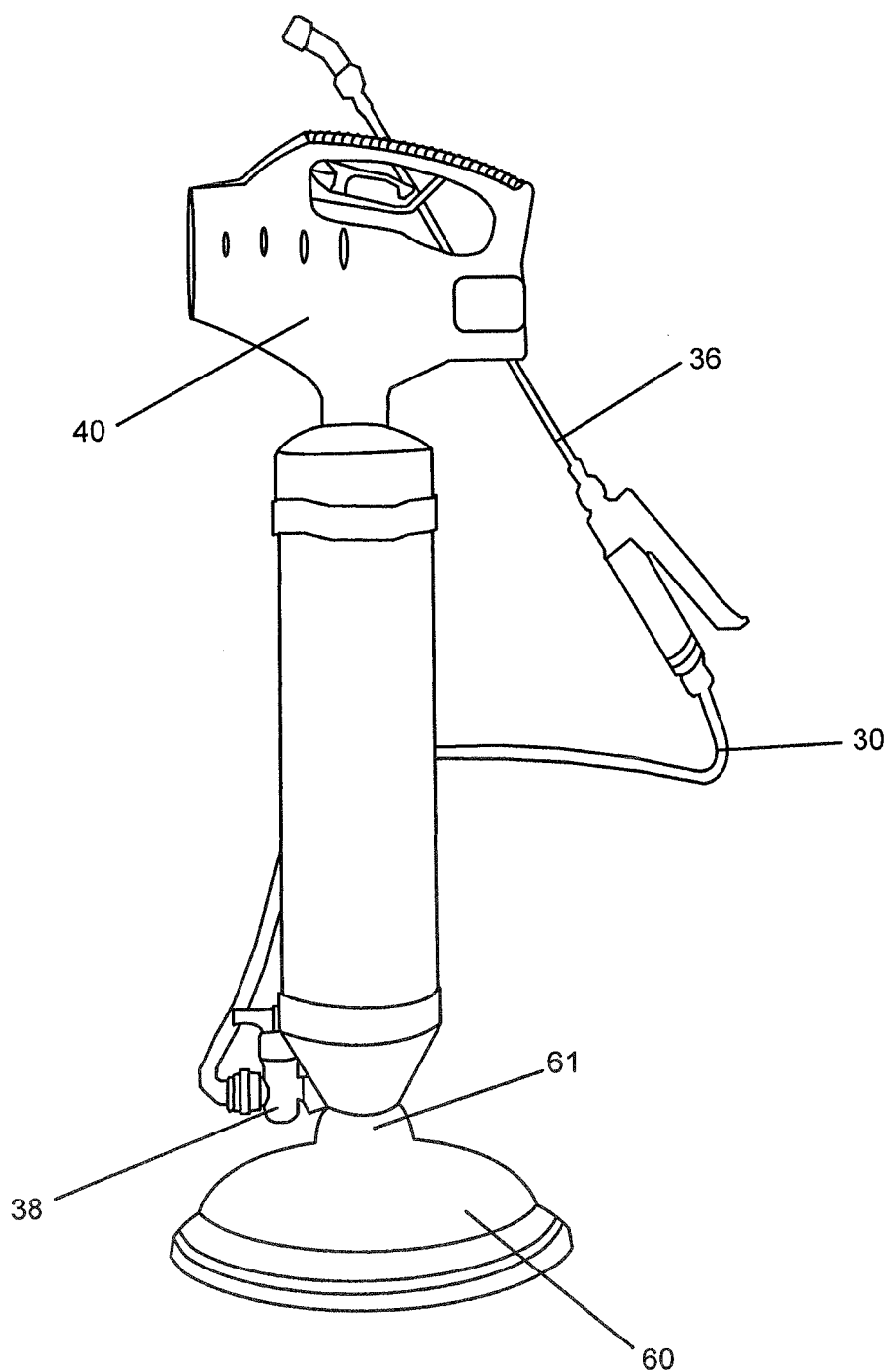
FIG. 8 depicts an exemplary drain clearing and fluid dispersal system comprising an integral pressurizable seal and wand, in accordance with various embodiments.

In various embodiments and with reference to FIG. 8, portable misting device 10 may comprise a cup 60 integral to the pressurizable fluid tank for creating at least a partial vacuum between the cup and a drain opening. For instance a clogged drain opening. Cup 60 may comprise a valve 61 between the interior of the cup 60 and pressurizable fluid tank. Pressurizable fluid tank may be filled with fluid, such as water. Cup 60 may come in various sized to accommodate varied drain opening sizes.

In operation, cup 60 may be placed around the opening of a drain. For instance, cup 60 may be placed around a clogged drain opening. A user may position and hold the portable misting device 10 applying force in the direction of the open cup 60 face. The pressure in pressurizable fluid tank may be increased via air compressor 40. Once the pressure within pressurizable fluid tank reaches a predetermined level, a portion of the fluid within pressurizable fluid tank may be released through valve 61 into the void between the cup and the opening of the drain. Valve 61 may be opened via a trigger on the handle of the unit. In response to depressing the trigger, the fluid released through valve 61 may force the clog to open. This may be repeated as needed. This embodiment may reduce the need for harsh chemicals in drain clearing.

In various embodiments and with continued reference to FIG. 8, portable misting device 10 may comprise a switch 38 for toggling between the pressurizable fluid tank and a fluid conduit 30. This may be used for delivering pressurized fluid via a wand 36. For instance, for cleaning areas proximate the clogged drain, such as a vanity, toilet bowl, sink basin, floors, walls. This embodiment may reduce the need for harsh chemicals cleaning surfaces.

In operation, water (or any liquid or gas) may be poured into the fluid tank 20 through the second opening 22 and the pressurizing means 40 is securely attached over the first opening 21. The fluid conduit 30 is securely attached over the second opening 22. If a fluid tank 20 comprising three openings is used, the third opening 23 may be used to fill and re-fill the fluid tank 20, so that the fluid conduit 30 may remain attached over the second opening 22. The pressurizing means 40 is activated at the switch and air fills the remaining space inside the fluid tank 20, thereby increasing the fluid tank pressure. Water from the pressurized fluid tank 20 then enters the inlet of the fluid conduit 30 through a valve 50, flowing until it reaches the closed distal end 31 of the fluid conduit. The water, being restricted from flowing further, is thereby forced through the openings 33 in the fluid conduit 34 to generate a fine mist. The rate of flow of water is controlled by valve 50 and that flow rate determines the volume and range of spray or mist produced. Valve 50 may be of a type which permits a gradual variation of flow between a full flow "ON" position and a no flow "OFF" position.

Other features of the fluid conduit 30 may make the assembly adaptable to a variety of outdoor uses. With reference to FIGS. 4A and 4B, a plurality of small hooks, clips, or hook-loop (Velcro®) fasteners may be spaced at intervals along the length of the fluid conduit 30 to enable the conduit to be securely mounted to a structure such as a tent, a chair, a canopy, a watercraft railing, or a tree. In addition, a quick-coupling assembly may be employed between the fluid conduit 30 and the fluid tank 20 to further facilitate assembly and disassembly of the misting device 10 for convenient storage and transport. For example, a ½ inch "cam & groove" coupling of the type commercially provided for connecting fire hoses may be utilized with the fluid conduit 30 employed in various embodiments.

It has been found that a variety of commercially available nozzles are suitable for producing the very fine mist desired by various embodiments. Furthermore, it has been found that a flow rate of 0.5 gallons per hour through each nozzle is suitable for producing this fine mist. Although these features are desirable, it should be understood that any flow rate, pipe diameter, and nozzle combination which produces a suitable fine water mist could be utilized in accordance with the present.

In various embodiments, pressurizing means 40 comprises a lithium battery operated air compressor. The air compressor may compresses air into a container filled with fluid and push the fluid thru an outlet line. The outlet line may comprise a wand 36 or multi-tip line used for spraying a fluid (of any suitable type or viscosity). For instance, wand 36 may further comprise a trigger for dispensing fluid. The spray tips may range from substantially the size of a pin hole to substantially the size of a fire hose.

In various embodiments, a previous aerosol based application, such as spray paint, hair spray, deodorizer, liquid cleaning supply can be delivered via the present method and apparatus without the need for aerosol. Stated another way, aerosol is a suspension of fine solid particles or liquid droplets in a gas. Using the pressurizing means 40 and system any fluid can be safely dispersed through the system.

Figure 5C:
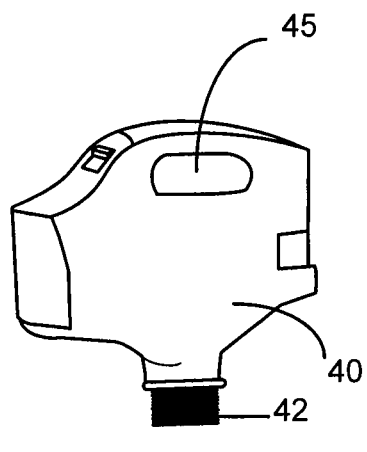
FIGS. 5A-5C depict a hand held pressurizing device configured to be able to be coupled to a pressurizable fluid tank, in accordance with various embodiments.
Figure 5B:
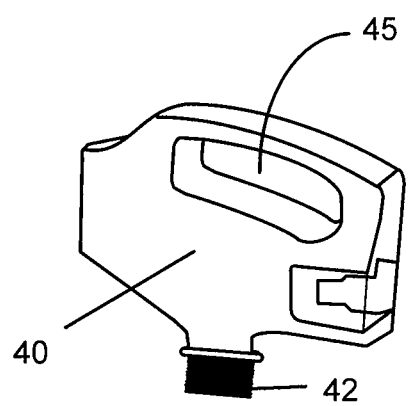
Figure 5A:
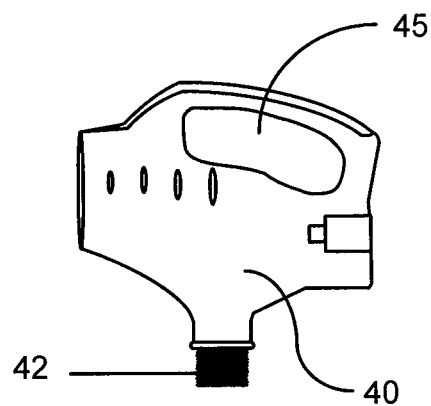

The unit may be configured to comprise a canister with a spray apparatus, such as a spray gun and a portable handheld mini air compressor. The mini air compressor may be located anywhere within the device. With reference to FIGS. 5A-5C, the mini air compressor 40 is located within the handle 45 of the system. The compressor 40 may be coupled to a pressurizable fluid tank 20 or to a conduit coupled to at least one pressurizable fluid tank 20 via a coupling means. This may include, tabs, pin, threading, pressure fit, and/or other suitable coupling means.

Fluid may be introduced to the canister through an opening, such as a lid. These may be any fluids such as paint, hair spray, liquid cleaning supplies, etc. Next, the compressor is activated. The compressor may be activated by triggering a switch, level, button, dial, electronic readout, and/or electronic interface, which will pressurize the canister to a desired pressure. Dispersal of the liquid may be facilitated by triggering a switch, level, button, dial, electronic readout, and/or electronic interface. For instance pulling the spray trigger a selectable choice of liquid will be spraying out. For instance, more than one fluid may be stored in various multiple fluid tanks 20. In various embodiments the system may utilize larger tanks, such as greater than 10 gallons. The highly portable device customized for a specific use may be used indoors or outside. For instance, used at outside events which get infested by mosquitoes and nats. The system may be utilized as a fogger for outside insects and pests. In various embodiments, the system may be used for therapeutically misting inside or outside for extreme relief and relaxation.

Principles of the present disclosure may also suitably be combined with principles of misters as disclosed in a U.S. Pat. No. 6,189,805, entitled "AUTOMATIC PORTABLE MISTING DEVICE" filed on Sep. 24, 1998 and having common ownership as the present application, the contents of which are hereby incorporated by reference in their entirety.

In various embodiments, a dispersal system may include a compressor and two chambers. The two chambers may interface via a channel or tube. Pressurized gas (e.g., air) may exist in the first chamber. The gas may exist in the first chamber over a range of pressure (e.g., 45 psi-65 psi). The gas from the first chamber is forced into a channel (e.g., interfacing tube) and travels through the interfacing tube to the second chamber. The gas then pushes on the contents of the second chamber. The contents may include, for example, gas, air, powder, liquid, water, mist, fogger, car wash chemicals, tire sealant, sauces, paint, stain, clear coat, ice/snow melting chemicals (e.g., salt in warm water), automotive chemicals (e.g., engine cleaner), fire retardant, pesticides, insecticide, fertilizers, weed & feed, pool cleaning chemicals, floor sealant chemicals, hunting chemicals (e.g., pheromones), bbq/fire accelerant, detergents, glass cleaner, bleach, aromatherapy, humidifier, etc. The pressure on the contents of the second chamber forces the contents out of the second chamber through an exit (e.g., exit tube).

The system may include a third chamber 20c that may disburse contents into the first chamber, second chamber or disburse inline (e.g., after the second chamber but before exiting the nozzle). The third chamber may disburse periodically, randomly, upon demand, based on pressure changes, use an electronic disbursement valve 56 which may disburse at a certain rate, or use a manual disbursing valve. A valve may be included in front of the third chamber to prevent any contents, liquid or gas from going back into the third chamber.

The gas in the first chamber may stay at a constant pressure (aside from some pressure reduction due to any insufficient seal). The gas in the first chamber may include sustaining pressure that can continually impact the second chamber. The constant pressure in the first chamber may be maintained by using a pressure relay to control the gas pressure in the first chamber. If the pressure gets below a set pressure, then the pressure relay will activate the compressor to add more pressure into the first chamber. For example, the first chamber may reduce to 25 psi-45 psi over time, so the compressor may be used to increase the pressure in the first chamber again. If the pressure reaches a set pressure, then the pressure relay will deactivate the compressor to stop adding more pressure. A manual, electric or software controlled pressure relay or regulator may be included to control the desired pressure.

A computer chip, an app and/or software may be included that allows the system to de-pressurize the tanks over a set regulatory pressure to control the correct pressure in the tank. The system may include a regulatory pressure valve (e.g., manual or electric) which can be set with a threshold PSI pressure to avoid the pressure exceeding that PSI pressure and causing safety issues.

An external hose may be attached to the first chamber or attached to the compressor. Such an external hose may be used to air up any item (just like the full capability of an on board portable air compressor. When most or all of the contents are forced out of the second chamber, the pressurized air may also exit through the exit tube.

In various embodiments, the system may interface with a smart phone, USB port, an app, a GPS, a dedicated controller, Bluetooth from a smart phone to communicate with a controller and/or the like. In various embodiments, the system may provide a battery back-up for the smart phone or other devices. Such other devices may similarly provide an extra energy source for the system. In various embodiments, the system may also include a panic switch or a button in the smartphone app to call police, fire or any other first responders.

The second chamber may include a split hose on the end of the exit tube to allow for different exit nozzles (flow and mist). The first chamber or second chamber may include multiple chambers. For example, the first chamber may provide pressure to a second and third chamber, wherein the second chamber may include one liquid and the third chamber may include a second liquid. In various embodiments, the mist system may help keep the body temperature up to 30 F degrees cooler in hot temperature areas.

In various embodiments, the dispersal system may include a compressor and second chamber with a bladder (as the first chamber) that occupies a portion of the second chamber. A bladder may be desired to fully separate condensation from the contents. The bladder may serve some of the functions of the first chamber, discussed above. In other words, the pressurized gas (e.g., air) enters the bladder and expands the bladder. The expansion of the bladder puts pressure on the contents of the second chamber. The pressure on the contents in the second chamber forces the contents out of the second chamber. The chamber may be comprised of any material or combination of materials such as, for example, plastic, aluminum, steel, alloy, fiber glass, carbon fiber or any other material with sufficient structural rigidity to hold the gas and/or liquid at different pressures.

The system may include an auxiliary jack in either chamber to accept an extra line for providing an additional gas or content source.

Figure 9:
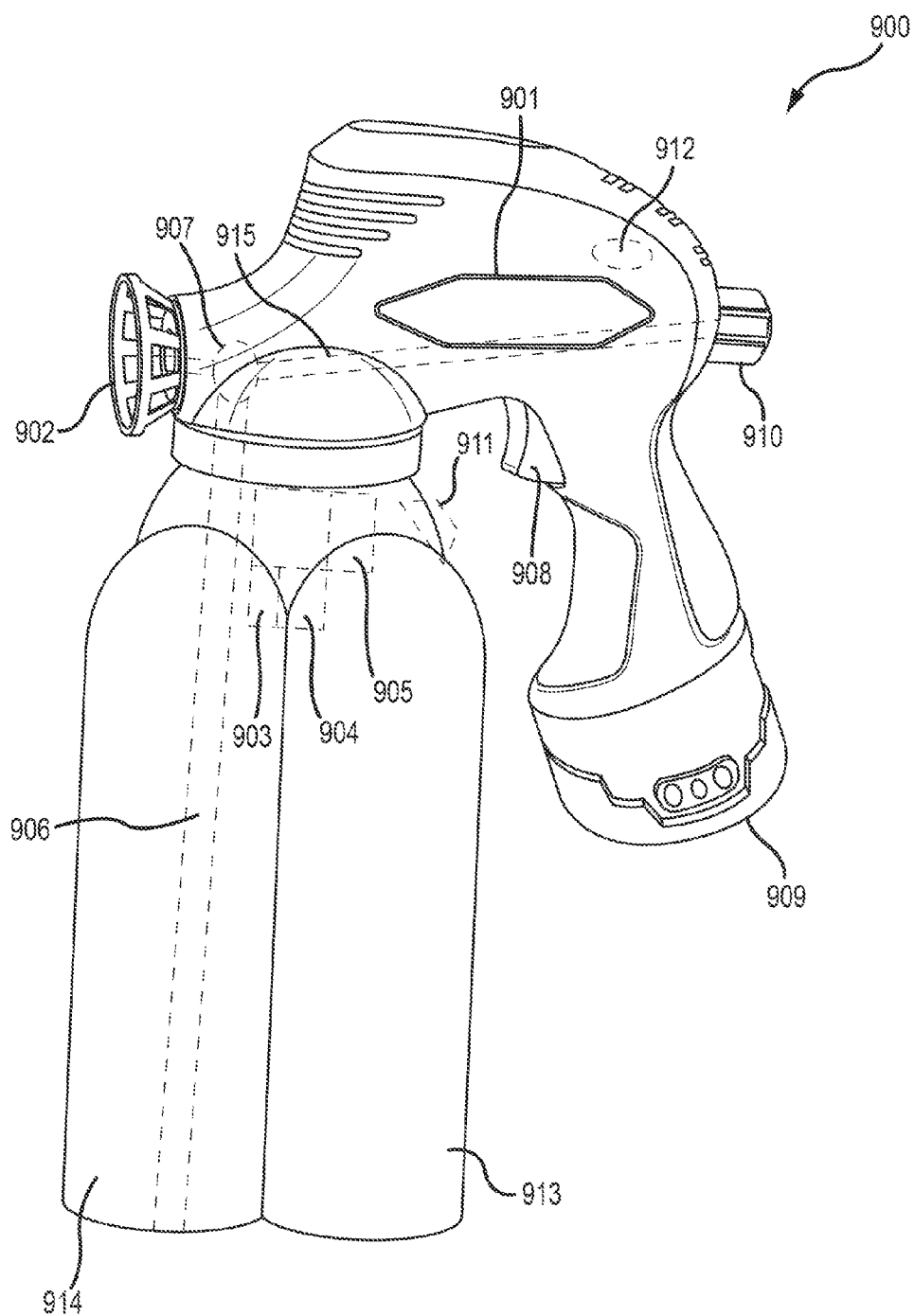
FIG. 9 depicts an exemplary portable sprayer system with two tanks.

The dispersal system may be incorporated into a portable sprayer system. With reference to FIG. 9, the portable sprayer system 900 may comprise a compressor 901, a spray nozzle 902, an internal backflow valve 903, an internal filter 904, an air inlet valve 905, a flow tube 906, a ball valve 907, a trigger 908, a power source 909, an adjustable flow knob 910 a pressure relief valve 911, a pressure gauge 912, first chamber 913 and second chamber 914.

Portable sprayer system 900 may replace the need for aerosol cans. For example, portable sprayer system 900 may be used to disperse or apply tire sealant (e.g., for flat tires or balls), hair products (e.g., hair spray, water, etc), suntan lotion, applying liquids on food (e.g., oils, butters, sauces, etc), cleaning products (e.g., glass cleaner, bleach, etc), pesticides, (e.g., roach powders into walls, cabinets and couches), detergents, paint, security chemicals (e.g., pepper spray), air cleaning (e.g., keyboards, electronics, dusting, etc), and/or air accelerator or other liquid accelerator (e.g., bbq, fire, wood, charcoal).

Compressor 901 may be in communication with trigger 908. Trigger 908 may activate compressor 901. The trigger may be a mechanical, electrical, optical, software and/or any other activation component. Trigger 908 may activate compressor 901 by sending an activation signal via mechanical actuation, electrical signal, optical signal, software signal and/or the like. Compressor 901 may force gas into first chamber 913 via air inlet 905 to create pressurized gas within first chamber 913. First chamber 913 may interface via a channel or tube with second chamber 914. The gas from first chamber 913 is forced into the interfacing tube and travels through the interfacing tube to second chamber 914.

The gas from first chamber 913 may travel through internal backflow valve 903 on its way into second chamber 914. Internal backflow valve 903 may be a one-way valve that restricts the backflow of liquid or air such that the air or liquid in second chamber 914 does not go back into first chamber 913. The gas from first chamber 913 may also travel through an internal filter 904 on its way into second chamber 914. Internal filter 904 reduces or restricts particulates, condensation and other undesirable contents from first chamber 913 entering into second chamber 914.

In various embodiments, the system may also have an external filter that filters the liquid (e.g., in a drinking water system) after the liquid leaves nozzle 902. Internal filter 904 may not be needed when an external filter is used, or both filters can be used in the same system. When the system is attached to a drinking water system (e.g., reverse osmosis system), the system may apply suggested chemicals into the tank to kill bacteria, then run pressurized water from the portable tank through the osmosis system to purify the chemicals from the water.

The gas then pushes on the contents (e.g., liquid, tire sealant, sauces, paint, fire retardant, etc.) of the second chamber 914. The pressure on the contents of the second chamber forces the contents out of the second chamber through flow tube 906. Flow tube 906 interfaces with exit tube 915. Ball valve 907 may be located at the intersection of flow tube 906 and exit tube 915. Exit tube 915 may interface with adjustable flow knob 910 and spray nozzle 902. When most or all of the contents are forced out of the second chamber, the pressurized air may also exit through the exit tube 915.

Spray nozzle 902 may serve as the exit point for the liquid or gas from the chamber. Spray nozzle 902 may be adjustable to provide various types or geometries of spray (e.g., spray, mist, flow). Spray nozzle 902 may include different tips and nozzles for a desired spray or flow pattern of any of the contents exiting the sprayer.

Power source 909 may be a battery, solar cell, or any other power supply. Power source 909 may supply power to the compressor, trigger, optional light or any other component. The system may also include a timer that communicates with trigger 908, power source 909, adjustable flow knob 910 and/or another component or added component. The timer may provide for timed release of the liquid by activating or deactivating the battery, trigger or other component at certain times and/or for certain durations. The timer may be used to implement pre-planned dispersals of contents or air.

Adjustable flow knob 910 may regulate the pressure of the liquid flowing out of system 900. Adjustable flow knob 910 allows the back pressure within the first chamber to stay the same, while still allowing for regulation of the content flow out of spray nozzle 902. Adjustable flow knob 910 restricts or enhances flow by impacting the flow. The flow may be impacted by adjusting a flow restrictor or door (e.g. ball valve 907). Ball valve 907 impacts the line (e.g. is within the line) exiting the liquid chamber and is prior to the liquid exiting out of system 900 via spray nozzle 902. Ball valve 907 may allow more liquid to flow when the opening within the ball is in line with the flow in the flow tube, while ball valve 907 restricts flow when the opening is moved perpendicular to the flow.

Pressure relief valve 911 may interface with a first chamber, a second chamber and/or a bladder. Pressure relief valve 911 may automatically open if the pressure exceeds a certain threshold amount to help reduce excess pressure, avoid cracking or avoid an explosion of the chamber or bladder. Pressure relief valve 911 may also include a manual release to allow a user to manually allow gas or liquid to exit or reduce pressure at any time.

Figure 10:
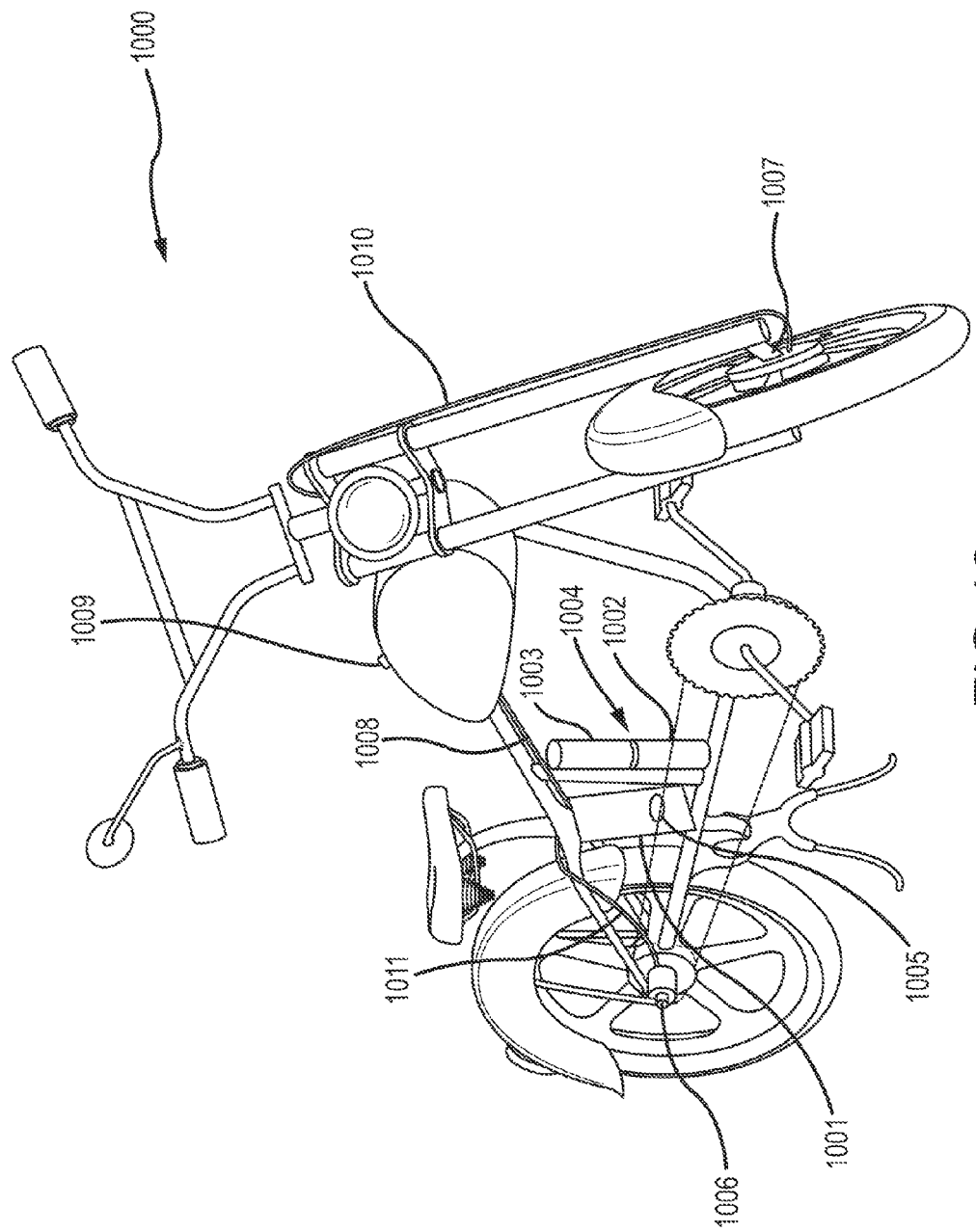
FIG. 10 depicts an exemplary bicycle with a misting system, tire inflation/deflation system and tire sealant system, in accordance with various embodiments.

Various components of the dispersal system may be included on a bicycle to provide misting and tire inflation/deflation. While the system will be described with respect to a bicycle, one skilled in the art will appreciate that similar systems may be applied to a pedal assist bike, motorcycle, ATV, golf cart, boat, recreational vehicle or any other vehicle or any other structure. With reference to FIG. 10, an exemplary bicycle system 1000 is shown with a misting system, a tire inflation/deflation system and a tire sealant system, in accordance with various embodiments. Bicycle system 1000 may include a compressor 1001, a first chamber 1002, a second chamber 1003, an internal backflow valve 1004, an external air outlet 1005, a first air inlet for the back tire 1006, a second air inlet for the front tire 1007, an air line for the mister 1008 and a mist outlet 1009.

Second chamber 1003 may include tire sealant such that the bicycle system 1000 pushes the tire sealant into the tires via first air inlet for the back tire 1006 and a second air inlet for the back tire 1007. First chamber 1002 and a second chamber 1003 may interface via a channel or tube. Pressurized air may exist in the first chamber 1002. The gas in the first chamber 1002 may stay at a constant pressure. The constant pressure may be maintained by using a pressure relay to control the gas pressure in the first chamber 1002. The gas may exist in the first chamber 1002 over a range of pressure (e.g., 45 psi-65 psi). The gas from the first chamber 1002 is forced into the interfacing tube and travels through the interfacing tube to the second chamber 1003. The gas then pushes on the tire sealant of the second chamber 1003. The pressure on the tire sealant in the second chamber 1003 forces the tire sealant out of the second chamber 1003 through an exit (e.g., exit tube). The exit tube may include two exit tubes or a split tube. The exit tube may lead to air inlets 1006 and/or 1007. After most or all of the tire sealant is forced out of the second chamber 1003, the pressurized air may also exit through the exit tube, travel down separate tubes (first tube going to the back tire 1011 and a second tube going to the front tire 1010) and into air inlets 1006 and/or 1007 to inflate the tires.

The gas in the first chamber 1002 may include sustaining pressure that can continually impact the second chamber 1003. However, the first chamber 1002 may reduce to 25 psi-45 psi over time, so the compressor 1001 may be used to increase the pressure in the first chamber 1002 again.

A manual, electric or software controlled regulator may be included to control the desired pressure. A computer chip, an app and/or software may be included that allows the system to pressurize the tanks with a set regulatory valve to control the correct pressure in the tank. The system may include an electric valve which can be set at any PSI pressure in order to use an external hose to air up anything just like the full capability of an on board portable air compressor. The system may also include an air bleeder valve (which may be electronic and controlled by the controller) to remove air from one or more tires. The pressure of the one or more tires may be adjusted separately, sequentially, randomly, periodically or jointly. For example, air may be removed from the tires when riding in sand, but the tires are re-inflated when going back onto pavement. The system may include an auxiliary jack in either chamber to accept an extra line for providing an additional source for air or sealant. For example, if another bicycle needs air or sealant. The system may also include a battery and/or solar panel as the power source.

The system may include any type of controller to regulate the distribution of tire sealant and air pressure into the tires. The regulation of the tire sealant and air pressure can occur while riding the bicycle or while the bicycle is stationary, but without the need to stop the bicycle. The controller may be implemented or controlled by a smart phone, USB port, an app, a GPS, a dedicated controller, Bluetooth from a smart phone to communicate with a controller and/or the like. The controller may also receive input from any communication device, a network, website, a social networking website or the like. The controller may also include input from a portfolio of the user and make adjustments based on the profile. A profile may comprise any information or data about a user that describes an attribute associated with the consumer (e.g., a preference, an interest, demographic information, personally identifying information, and the like). For example, the system can accept input of course details for an off-road bike race. The system may then analyze the GPS data to determine when to adjust the tire pressure of one or more tires along with course. The system may also include input (e.g., tire pressure input) from a coach or trainer that is watching the rider on a course.

Figure 11:
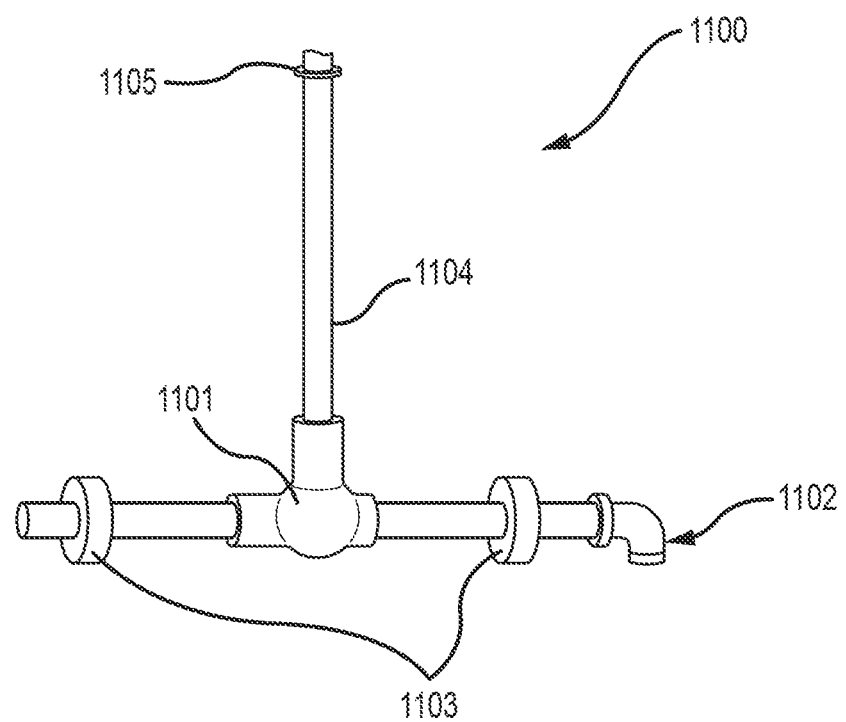
FIG. 11 depicts an exemplary air line system that is part of the hub axle, in accordance with various embodiments.

The air line may be part of the hub's axle allowing air to flow directly from the air chamber 1002 of bicycle system 1000 to the bicycle tire valves. Compressor 1002 can feed air directly into the tire valves or air from the air chamber 1002 can feed air to the tire valves. FIG. 11 depicts an exemplary air line system 1100 that is part of the hub axle for the bicycle system of FIG. 10, in accordance with various embodiments. The hub includes a swivel tee 1101 between bike hub bearings 1103, and an air inlet value 1102 on one end. The swivel tee 1101 allows the tire to rotate while the line 1104 to the tire valve 1105 stays stationary. Swivel tee 1101 is a fitting (e.g., coupler adaptor) that can handle high and low pressure. The air inlet valve 1102 may be a quick release valve to attach the air inlets 1006, 1007. The air inlet valve 1102 may also be configured straight in line with the hub or angled (e.g., 90 degrees) from the hub. The hub may include common drive gears and braking systems.

Figure 12:
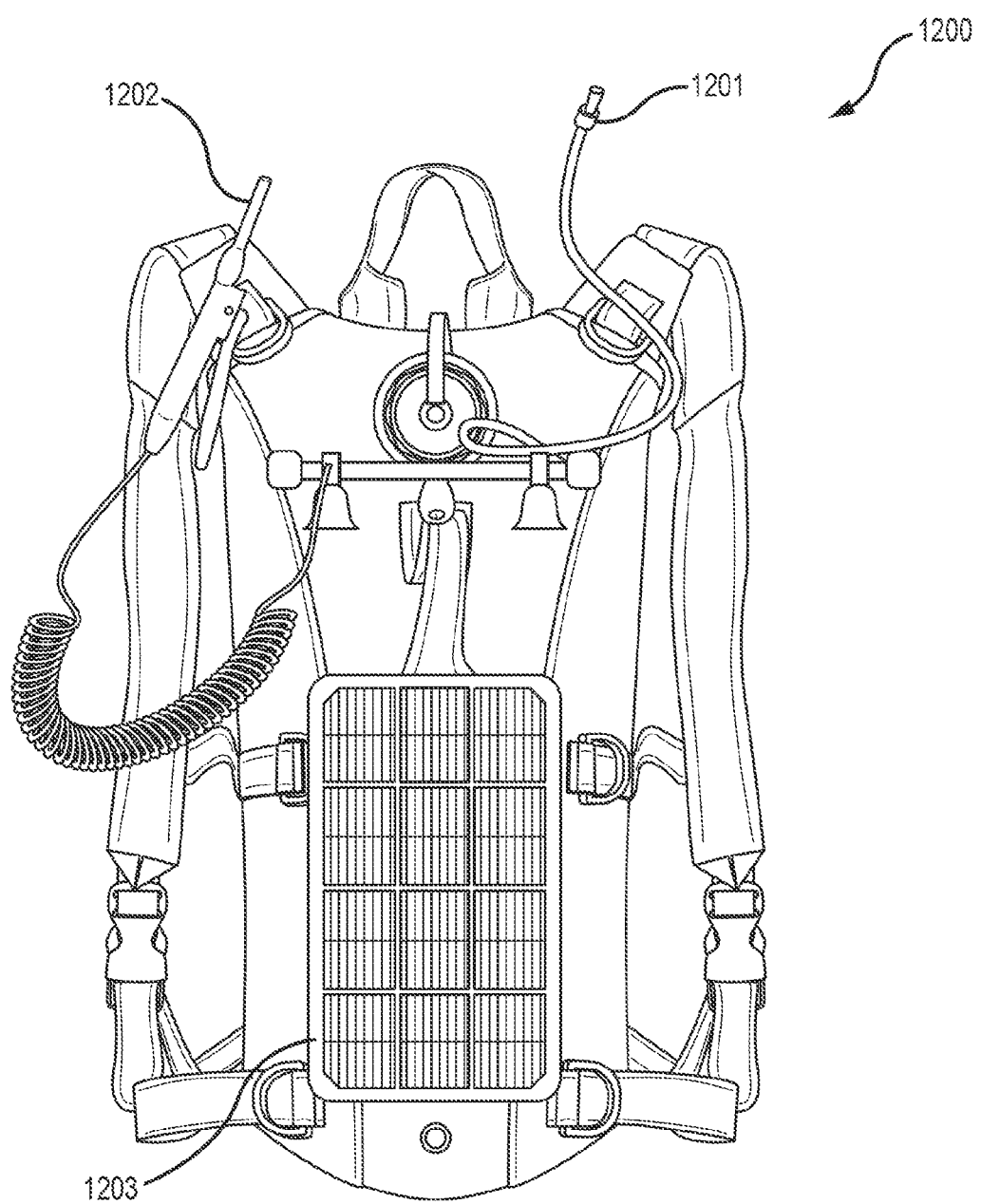
FIG. 12 depicts an exemplary backpack with a mist device, drinking water device, eye flush device and timer, in accordance with various embodiments.

With reference to FIG. 12, various components of the system may be included in an exemplary backpack 1200 with a mist device 1201, drinking water device, eye flush device, wound cleaning device and/or timer, in accordance with various embodiments. The backpack system may include a pressurized water flow line 1202 that may serve as a drinking water device, eye flush device, wound cleaning device, or other device that provide a flow of water. The power source 1203 may be a solar panel that could charge a battery or other devices that need to be charged. A timer with an on/off switch may be included to regulate a limited supply of water usage or to prevent over-saturation. A flow regulator may also be included to reduce, minimize or alter the flow of water to also conserve water.

The apparatus may be constructed of a variety of different materials. However, the materials are suitably selected to account for the stresses to which the apparatus will be subjected during operation, such as water, heat, rugged transport, and direct sunlight.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, PALM® OS®, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a PALM® mobile operating system, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, PALM® PILOT®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 COMPLETE, various authors, (Sybex 1999); Deborah Ray and Eric Ray, Mastering HTML 4.0 (1997); and Loshin, TCP/IP Clearly Explained (1997) and David Gourley and Brian Totty, Http, the Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: a Roadmap for the Enterprise (2003), hereby incorporated by reference.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the. The scope of the is accordingly to be limited by nothing other than the appended claims, in which reference to an element in the singular is not intended to mean "one and only one" unless explicitly so stated, but rather "one or more."

Moreover, where a phrase similar to 'at least one of A, B, and C' or 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C.

Although the has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
a portable first chamber having pressurized gas;
a portable compressor connected to the portable first chamber, wherein the portable compressor includes an automatic pressure relay;
the automatic pressure relay that communicates with an application that operates directly on the communication device such that a application on the communication device causes the pressure relay to automatically control the pressurized gas in the portable first chamber,
the automatic pressure relay that communicates with the application that operates directly on the communication device such that the application on the communication device causes the pressure relay to de-pressurize the portable first chamber over a set regulatory pressure to control the correct pressure in the portable first chamber,
a portable second chamber connected to the portable compressor and the portable first chamber,
wherein the portable second chamber includes contents,
wherein the portable second chamber includes an exit from the portable second chamber,
wherein the pressurized gas from the portable first chamber travels into the portable second chamber to force the contents out of the exit of the portable second chamber;
a first switch connected to the portable compressor, wherein the switch distributes the pressurized gas to at least one of an auxillary line, the portable first chamber or the portable second chamber;
a second switch that toggles between the portable first chamber and the portable second chamber to allow at least one of the contents from the portable first chamber and the contents from the portable second chamber to exit into a fluid conduit and out through a wand;
a portable third chamber for disbursing contents into inline, the portable first chamber and the portable second chamber,
wherein the portable third chamber includes an automatic disbursement valve, the automatic disbursement valve that communicates with the application that operates directly on the communication device such that the application on the communication device causes the automatic disbursement valve to disburse at least one of periodically, randomly, upon demand, based on pressure changes, or at a certain rate.

2. The system of claim 1, wherein the compressor is removably connected to the portable first chamber.

3. The system of claim 2, wherein the portable second chamber is connected to the portable first chamber via a channel.

4. The system of claim 3, wherein the pressurized gas in the portable first chamber stays at a constant pressure when not in use.

5. The system of claim 4, wherein the portable first chamber is a bladder, and wherein the bladder is within the portable second chamber such that pressure from the bladder on the contents in the portable second chamber forces the contents out of the portable second chamber.

6. The system of claim 5, further comprising a backflow valve, inline filter, adjustable flow knob, pressure relief valve, timer and a pressure gauge.

7. The system of claim 6, wherein in response to the contents exiting the portable second chamber, the pressurizing gas exits from the exit in the portable second chamber.

8. The system of claim 7, further comprising a filter within the portable second chamber that filters the contents before the contents exit the portable second chamber.

9. The system of claim 8, further comprising an internal backflow valve that restricts backflow of the contents such that the contents in the portable second chamber is restricted from going back into the portable first chamber.

10. The system of claim 9, further comprising an air hose interfacing with the portable first chamber for providing pressurized air to other items.

11. The system of claim 10, further comprising a timer for timed release of the contents through the exit.

12. The system of claim 11, further comprising an auxiliary jack to interface with an extra line, wherein the extra line provides additional of at least one of the gas or the content.

13. The system of claim 12, further comprising a controller to control the disbursement of at least one of gas or content.

14. The system of claim 13, further comprising a backpack having at least one of a misting device, drinking water device, eye flush device or wound cleaning device.

15. The system of claim 1, wherein the exit includes a first air inlet for a back tire of a vehicle and a second air inlet for a front tire of a vehicle, and wherein an application in the communication device causes the exit to disburse the contents into at least one of the back tire or front tire at different geographical locations.

16. The system of claim 15, wherein the contents include at least one of air or tire sealant.

17. The system of claim 15, wherein the exit further includes an air line for a mister and a mist outlet.

18. The system of claim 1, further comprising an external filter outside the second chamber that filters the contents after the exit.

19. The system of claim 1, wherein the contents includes purifying chemicals for drinking water, and wherein the contents exit through an osmosis system to remove the purifying chemicals from the drinking water.

20. The system of claim 1 further comprising a power source that powers the portable compressor, wherein the power source is at least one of electricity, a battery, a rechargeable battery, AC electric power, a solar cell, a fuel-powered generator or a solar rechargeable battery.

* * * * *

UNITED STATES PATENT AND TRADEMARK OFFICE
CERTIFICATE OF CORRECTION

PATENT NO. : 9,931,654 B2
APPLICATION NO. : 14/746709
DATED : April 3, 2018
INVENTOR(S) : Scott Allen West et al.

Page 1 of 1

It is certified that error appears in the above-identified patent and that said Letters Patent is hereby corrected as shown below:

In the Claims

In Column 19, Line 18, please delete "directly on the communication device such that a application" and insert therefore --directly on a communication device such that the application--.

Signed and Sealed this
Thirty-first Day of July, 2018

Andrei Iancu
*Director of the United States Patent and Trademark Office*